(12) United States Patent
Kuhl et al.

(10) Patent No.: US 8,847,109 B2
(45) Date of Patent: Sep. 30, 2014

(54) METHOD AND DEVICE FOR MACHINING A WORKPIECE

(75) Inventors: Michael Kuhl, Fuessen (DE); Peter Hildebrand, Pfronten (DE); Martin Reisacher, Kempten (DE)

(73) Assignee: Sauer GmbH Lasertec, Kempten (DE)

( * ) Notice: Subject to any disclaimer, the term of this patent is extended or adjusted under 35 U.S.C. 154(b) by 1180 days.

(21) Appl. No.: 12/531,591

(22) PCT Filed: Mar. 17, 2009

(86) PCT No.: PCT/EP2009/002104
§ 371 (c)(1),
(2), (4) Date: Jan. 22, 2010

(87) PCT Pub. No.: WO2008/113534
PCT Pub. Date: Sep. 25, 2008

(65) Prior Publication Data
US 2010/0155381 A1 Jun. 24, 2010

(30) Foreign Application Priority Data

Mar. 16, 2007 (DE) .................. 10 2007 012 815

(51) Int. Cl.
*B23K 26/36* (2014.01)
*B23K 26/00* (2014.01)
*B23K 26/08* (2014.01)
*B23K 26/06* (2014.01)

(52) U.S. Cl.
CPC ......... *B23K 26/0626* (2013.01); *B23K 26/0807* (2013.01)
USPC ............. 219/121.68; 219/121.79; 219/121.82

(58) Field of Classification Search
USPC ............... 219/121.7, 121.67, 121.72, 121.78, 219/121.68, 121.79, 121.82
See application file for complete search history.

(56) References Cited

U.S. PATENT DOCUMENTS

| | | | |
|---|---|---|---|
| 4,258,246 A | * | 3/1981 | Karube et al. ............. 219/121.8 |
| 5,043,566 A | * | 8/1991 | Andoh et al. ............. 250/206.1 |

(Continued)

FOREIGN PATENT DOCUMENTS

| | | |
|---|---|---|
| DE | 19860585 A1 | 7/2000 |
| DE | 10309157 A1 | 9/2004 |

(Continued)

OTHER PUBLICATIONS

Notification of Transmittal of Translation of the International Preliminary Report on Patentability (form PCT/IB/338) of International Application No. PCT/EP2008/002104 mailed Oct. 15, 2009 with forms PCT/IB/373, PCT/IB/326 and PCT/ISA/237.

(Continued)

*Primary Examiner* — Zandra Smith
*Assistant Examiner* — Tsz Chiu
(74) *Attorney, Agent, or Firm* — Westerman, Hattori, Daniels & Adrian, LLP (57) ABSTRACT

In a method for machining a workpiece, a laser beam (5) is guided across the workpiece surface by means of a beam guide (2, 51), wherein the laser beam guide comprises a first guide (2) effecting a laser beam guide at a first path speed. The laser beam guide comprises a second guide (51) simultaneously operating with the first guide, which effects a laser beam guide at a second path speed, which is higher than the first path speed.

20 Claims, 4 Drawing Sheets

(56) References Cited

U.S. PATENT DOCUMENTS

| | | | |
|---|---|---|---|
| 5,338,915 A | | 8/1994 | Hildebrand et al. |
| 5,605,097 A | * | 2/1997 | Ruckl et al. ............... 101/128.4 |
| 5,837,962 A | | 11/1998 | Overbeck |
| 6,037,967 A | | 3/2000 | Allen et al. |
| 6,263,227 B1 | * | 7/2001 | Boggett et al. ............... 600/407 |
| 6,574,395 B1 | * | 6/2003 | Mechin et al. ................. 385/37 |
| 6,720,519 B2 | * | 4/2004 | Liu et al. .................. 219/121.61 |
| 7,232,741 B2 | | 6/2007 | Nagai et al. |
| 7,385,758 B2 | * | 6/2008 | Aono et al. ................... 359/390 |
| 7,689,022 B2 | * | 3/2010 | Weiner et al. ................ 382/133 |
| 7,834,293 B2 | * | 11/2010 | Wile et al. ............... 219/121.69 |
| 7,871,812 B2 | * | 1/2011 | Weiner et al. .............. 435/287.2 |
| 7,955,905 B2 | * | 6/2011 | Cordingley et al. .......... 438/132 |
| 2001/0009250 A1 | * | 7/2001 | Herman et al. .......... 219/121.69 |
| 2003/0102291 A1 | * | 6/2003 | Liu et al. ................. 219/121.73 |
| 2004/0012676 A1 | * | 1/2004 | Weiner et al. ............. 348/207.1 |
| 2004/0196457 A1 | * | 10/2004 | Aono et al. ................... 356/318 |
| 2004/0206733 A1 | * | 10/2004 | Hillebrand et al. ...... 219/121.71 |
| 2005/0069000 A1 | | 3/2005 | Nagai et al. |
| 2005/0077275 A1 | | 4/2005 | Stoltz |
| 2005/0211680 A1 | | 9/2005 | Li et al. |
| 2005/0237895 A1 | | 10/2005 | Tanaka et al. |
| 2006/0144826 A1 | | 7/2006 | Becker et al. |
| 2006/0169677 A1 | | 8/2006 | Deshi |
| 2007/0181542 A1 | | 8/2007 | Hildebrand et al. |
| 2007/0240325 A1 | * | 10/2007 | Pelsue et al. ..................... 33/707 |
| 2007/0257012 A1 | * | 11/2007 | Wile et al. .................. 219/121.7 |

FOREIGN PATENT DOCUMENTS

| | | |
|---|---|---|
| DE | 10392185 T5 | 12/2004 |
| DE | 102004051180 A1 | 7/2005 |
| DE | 102005039833 A1 | 3/2007 |
| DE | 102007012695 A1 | 9/2008 |
| EP | 0536625 A1 | 4/1993 |
| WO | 98/27450 A1 | 6/1998 |
| WO | 2004/105996 A1 | 12/2004 |

OTHER PUBLICATIONS

International Search Report for PCT/EP2008/00214, mailing dated of Jul. 7, 2008 anad PCT/ISA/237 Written Opinion form.

* cited by examiner

METHOD AND DEVICE FOR MACHINING A WORKPIECE

The invention relates to a method and a device for machining a workpiece, in particular for machining a workpiece by means of a pulsating laser beam. FIG. 1 shows known features for machining a workpiece by means of a laser beam.

Figure 1A:
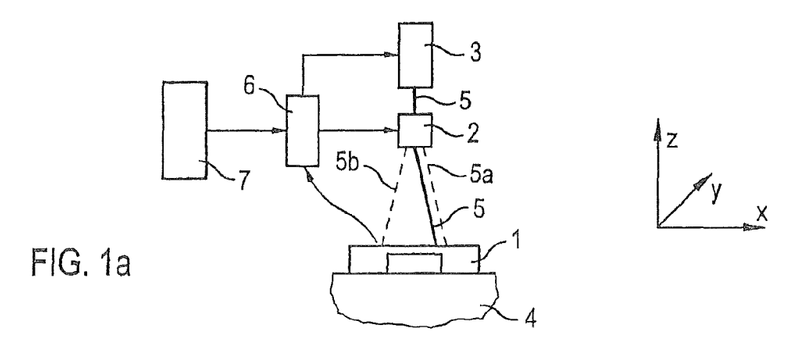
FIG. 1 shows prior art illustrations.

FIG. 1a schematically shows a side view of a laser machining device. 1 is the workpiece. 4 represents the workpiece table on which the workpiece 1 is mounted. 5 symbolizes the machining laser beam which is guided in a certain area by a beam guide 2. 3 is the laser light source which emits laser light, the laser light then travelling into the beam guide 2 and being directed onto the workpiece 1 by it. 6 symbolizes a control which can receive process data and which drives at least the beam guide 2 and the laser source 3. It can be connected to a higher-ranking control 7. Depending on the design, it can even perform high-ranking control tasks and can be connected to a memory 7 which holds cavity data or production data, for example, in compliance with which the workpiece 1 is to be machined.

A coordinate system is schematically outlined: the x-direction extends horizontally in the plane of projection, the z-direction perpendicularly in the plane of projection and the y-direction perpendicularly to the plane of projection and rearwards.

The device of FIG. 1a can be used for both forming a cavity by laminar material removal in layers and machining a surface where it is not primarily the voluminous removal that is of interest but predominantly the creation of certain surface properties. This can be achieved within some few cycles (layers). In an extreme case, it is only necessary to traverse the respective surface points to be processed once (in the x/y-directions).

Figure 1B:
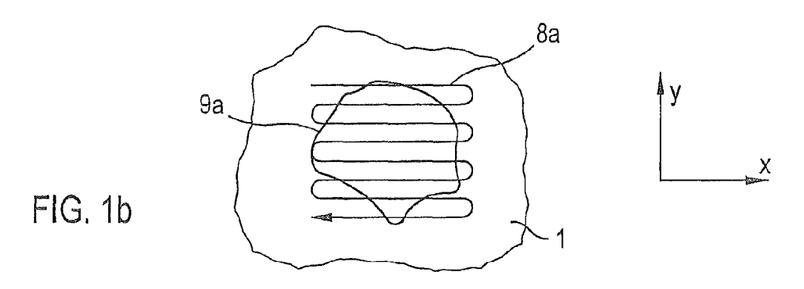
Figure 1C:
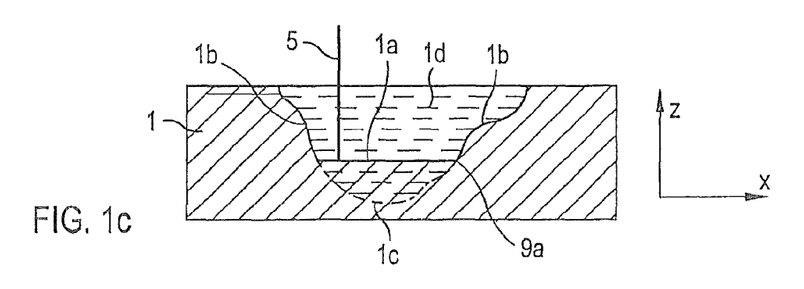

FIGS. 1b and 1c show the conditions when a cavity is formed, i.e. with voluminous material removal. FIG. 1b is a plan view of the workpiece, FIG. 1c is a section through the workpiece. The meandering curve 8a represents the movement of the laser beam on the workpiece surface. In this connection, it is pointed out that the laser beam has a certain diameter on the workpiece surface and the width (perpendicularly to the direction of movement in the plane of the workpiece surface) of impact on the workpiece surface also correlates with this diameter. Typical beam diameters range between 5 and 50 µm. In this connection, the distances of the individual meanders are correspondingly correlated relative to one another. Instead of a reciprocating meander, it is also possible to use e.g. a spiral or the line-by-line rectified traverse of machining lines. Reference numeral 9a refers to the machining limits in the respective layer. The laser beam 5 is activated inside the machining limits and it is deactivated outside of it so that its track only exists theoretically in the areas located outside. The laser beam effects a removal inside the limits 9a, but not outside thereof. Instead of the deactivation outside the machining limits, the selection of a strong defocusing is also possible so that the energy supply per unit area is no longer sufficient to machine the workpiece and the laser simultaneously operates continuously. According to FIG. 1b, a layer is removed. This is then followed by another layer where different machining limits 9a may apply. In this way, the cavity is formed into the depth as shown in FIG. 1c. 1a defines the momentary cavity bottom, i.e. the momentary workpiece surface, as viewed in FIG. 1b. The horizontally dashed lines schematically show the individual removed layers. The machining limits 9a differ from layer to layer, i.e. in the depth direction (negative z-direction), so as to form in this way a cavity having an accurately defined shape. It may concern e.g. the mould design or the like. 1c symbolizes the bottom of the finished cavity. It is not yet manufactured, but will be exposed in the course of time by the procedure of removing material in layers and area-wide.

Figure 1D:
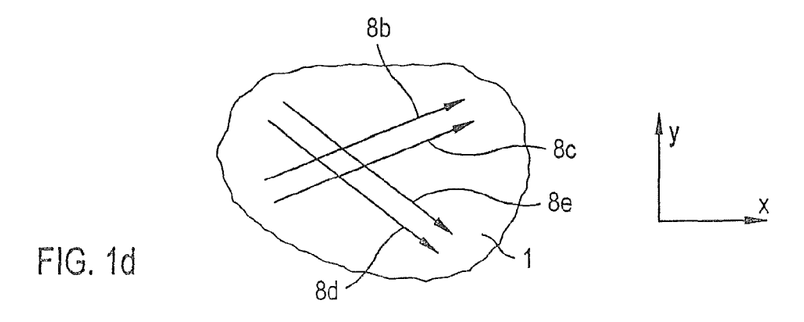

FIG. 1d shows a procedure of machining a surface. It is a plan view of the workpiece surface. Here, one or several individual tracks can be used. Machining may be, but does not have to be, carried out over the entire area. Parallel tracks 8b, 8c and 8d, 8e may be provided. In this way, it is possible to produce a surface having certain optical or mechanical properties. As in FIG. 1b, FIG. 1d introduces the respective track by the beam guide 2 of FIG. 1a. In this connection, the laser beam travels back a certain distance Δx over the workpiece surface within a certain time Δt so that correspondingly a path speed vB of the laser beam on the workpiece surface can be defined as Δx/Δt. Common path speeds are 100-300 mm/s. They are limited upwards by the adjusting accuracy decreasing with increasing speed.

Figure 1E:
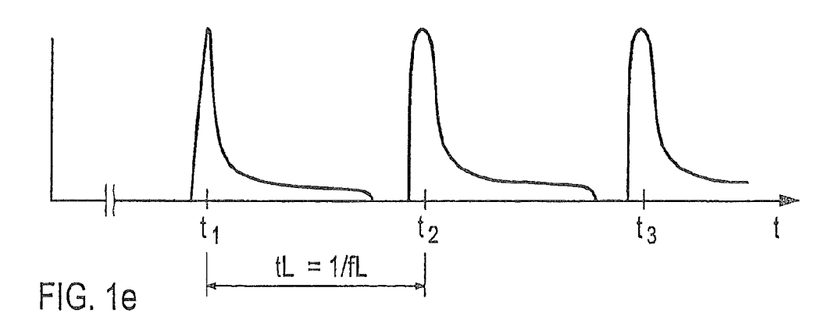

FIG. 1e shows the characteristic of the machining laser beam over time. The particular light output is shown. When the cross-sectional area of the laser beam is constant, the temporal course thus also corresponds to the energy supply based on the unit area. The laser beams preferably pulsate with constant period. The pulse peaks at the point in time t1, t2, t3 are given for which a constant time difference tL is assumed. This corresponds to a laser pulse frequency fL. The following applies:

$$tL = 1/fL.$$

Typical laser pulse frequencies fL are between 10 kHz and 100 kHz. However, a trend also towards markedly higher pulse frequencies fL has recently been found. Machining lasers having pulse frequencies around or above 1 MHz or around 2 MHz, also above 5 MHz up to 100 MHz or more, are meanwhile offered. It is desirable to use said lasers since in spite of the higher pulse frequency they have a pulse peak output relevantly determining the removal and corresponding to that of lasers having lower frequencies or even strongly exceeding it. A sample calculation shall follow for the purpose of clarification: A conventional average laser output of 10 W results in a pulse energy of 125 µJ when the pulse frequency is 80 kHz. With a pulse duration of 100 ns this yields a pulse peak output of 1250 W.

However, in new systems, an average laser output of 10 W can be supplied in pulsed fashion with 1 MHz. Here, the pulse durations are markedly shorter, e.g. 10 ps. This results in a pulse peak output of 1 MW.

Figure 1F:
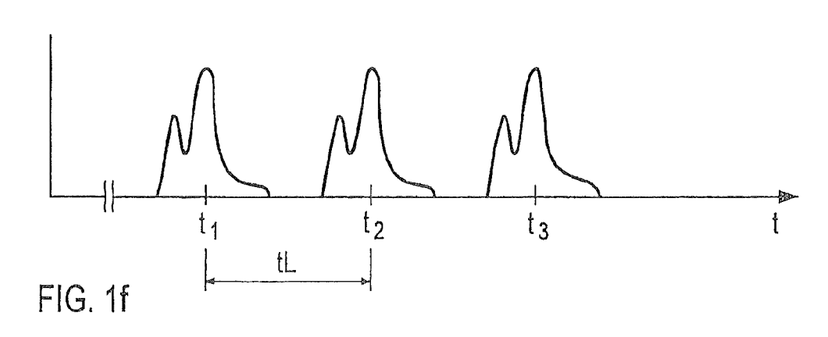

FIG. 1f shows another time diagram. It describes a special case of machining a workpiece by means of a pulsating laser beam where a warming pulse precedes the actual working pulse. In this case, the pulse frequency to be considered has to be measured between the working pulses, as shown in FIG. 1f.

The beam guide 2 has a certain finite adjusting speed. While it can be operated very rapidly in theory, this, however, affects the adjusting accuracy and thus the accuracy of machining the surface or forming the cavity on the workpiece. This leads to conditions which are explained with reference to FIG. 1d: FIG. 1d is a plan view of the workpiece surface. 8f refers to the momentary path of the laser beam over the workpiece surface. Depending on the path speed vB of the laser beam on the workpiece surface, the beam diameter dS of the laser beam at the workpiece surface level and the laser pulse frequency fL, the pulses may overlap. For example, assuming a pulse frequency fL of 100 kHz and a beam diameter dS of 10 µm, a path speed vB of 1 m/s results in compliance with $$vB = dS/tL = dS \times fL,$$

if it is desired that laser light impingement points do not at all overlap. However, today's beam guides, which are usually composed of movable mirrors, are limited as regards their guide speed on the workpiece surface to about 500 mm/s or 1000 mm/s. This means that the assumed numerical values already result in an overlap of about 50% of the beam diameter dS. If it is now assumed that an incoming laser pulse heats the material so as to liquefy and evaporate it (wherein the liquid phase can be passed through very rapidly), the result thereof in any case is that the subsequent laser pulse impinges on a point where the previous laser pulse was also effective immediately before.

This leads to various unpleasant effects. As a result, the workpiece is heated by the introduction of excess energy per unit time into the same absorption area which was hit earlier by previous pulses, also far beyond the laser beam limit, i.e. beyond the beam diameter, and is liquefied in a larger area, which results in an undesired increase in the melting portion. This in turn leads to the circumstance that the conditions are no longer accurately defined as far as the interaction between laser beam and workpiece surface is concerned. The removal of material thus becomes non-uniform and not accurately predictable.

Figure 1G:
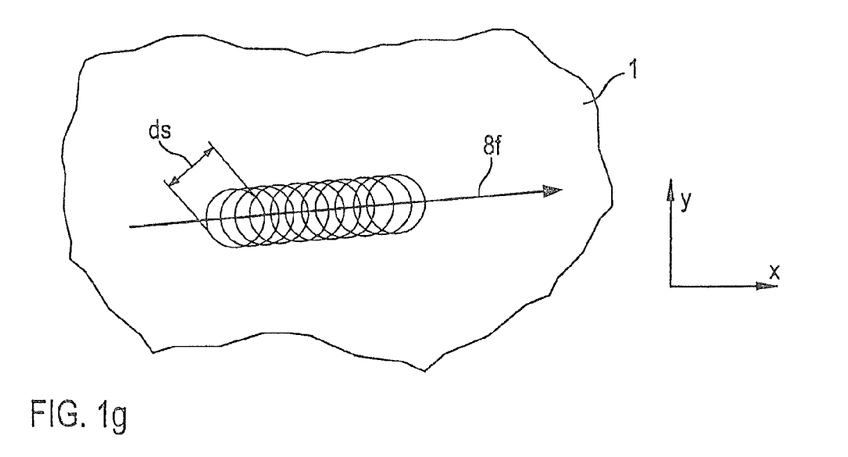

The problem gets worse with the initially mentioned increasing pulse frequencies. The above indicated numerical example shows that overlaps occur with already comparatively low pulse frequencies (100 kHz) in the light of the adjusting speeds of the laser beam guide 2. This will be all the more the case if the pulse frequency is not 100 kHz, for example, but rather 1 MHz or more and up to 100 MHz, for example. In a certain way, it is then possible to try to reduce the laser beam diameter or improve the adjusting speed. However, a significant overlap of individual pulses on the workpiece surface cannot be avoided with today's technology, as shown in FIG. 1g. In the case of high pulse frequencies of 500 kHz and more, it has to be assumed that with the prior art technology the overlap would be greater than 50% of the beam diameter on the workpiece surface and probably also greater than 80% of the beam diameter. This results even more in said inaccuracies with respect to the removal output.

Further prior art is found in DE102005039833A1, DE102004051180A1, DE10392185T5, EP0536625B1, DE10309157A1 and U.S. Pat. No. 5,837,962.

It is the object of this invention to provide a method and a device for machining a workpiece, which enable a stable and predictable control and adjustment of the removal output even with a high pulse frequency.

According to an embodiment of the invention, the path speed vB at which the laser beam is guided over the workpiece surface is adjusted by suitable technical means so as to yield the following conditions in the light of laser pulse frequency fL and beam diameter dS:

$$vB > n \times dS \times fL,$$

wherein n is a proportional factor which can be 0.5 or 0.7 or 1 or greater than 1. If the path speed changes over time, an average path speed or the maximum path speed can be used. The same applies to the laser pulse frequency fL.

For example, a fast path speed vB can be suitably adjusted such that a faster further movement having an optionally smaller amplitude is superimposed on the movement effected by the prior art beam guide 2. Then, two guides are provided one of which is the conventional beam guide, as described with reference to FIG. 1a, and the other of which is another beam guide which produces the superimposed guide of the laser beam.

A device for machining a workpiece can be designed for carrying out one of the above described methods and/or the variants described in this connection and those to be described below.

The workpiece to be machined can be or comprise a metallic material or a semiconductor material or ceramics or glass or plastics. The machining can be surface machining to influence the optical appearance or the roughness of a surface or it can be the formation of a cavity such that material is removed in layers and in laminar fashion so as to create a cavity having accurately defined side walls and an accurately defined bottom. When the cavity is formed, the accuracies may be better than a production accuracy of 100 μm, preferably better than 50 or 10 μm.

Each of the pulses can have sufficient energy for melting or evaporating the material at the point of impingement. In the embodiment of FIG. 1f, this applies to the actual working pulses and not necessarily to the preceding warming pulses.

Embodiments of the invention are described below with reference to the drawings, wherein.

Figure 2:
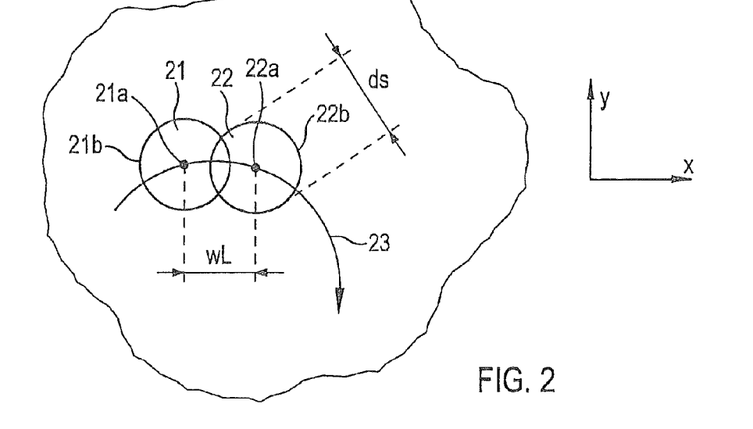
FIG. 2 shows an illustration explaining the effect of the invention.

FIG. 2 shows the conditions according to the invention. Reference numeral 8g shows the momentary path of the laser beam. It may be curved. 21 and 22 are two successive points of impingement of two successive working pulses of the laser light. Their imaginary centers are points 21a and 22a, respectively. Circles 21b and 22b designate in each case the diameter of the laser light beam. The distance wL between both centers 21a and 22a is the distance the laser beam travels between two working pulses. The conditions are adjusted such that the overlap is smaller than a predetermined value, in particular smaller than 30% or 50%. In general, the conditions can be described by the formula $$vB > n * dS * fL$$

wherein vB is the path speed of the pulsating laser beam on the workpiece surface, dS is the beam diameter at the workpiece surface level and fL is the pulse frequency of the working pulses of the pulsating laser light. In this connection, the pulse frequency can be greater than 100 kHz, preferably greater than 1 MHz and more preferably greater than 10 MHz. The value n is a proportional factor which may be 0.3 or 0.5 or also 1 or greater than 1. The overlap (corresponding to the proportional factor n) can be adjusted in accordance with the desired conditions.

The path speed is determined to be the speed resulting when the path covered between two pulses (wL) is divided by the time required for the distance (corresponding to tL=1/fL). In the case of variable speeds, it is possible to use an average value or in each case a momentary value together with momentary values of the respectively other variables.

The required path speed can be produced by generating a guide movement superimposed on the conventional guide. On the one hand, the laser beam can be guided by a conventional beam guide and, on the other hand, by another beam guide which generates a faster movement. Here, the conventional beam guide (reference numeral 2 in FIG. 1a) can have an amplitude (maximum deflection) greater than that of the beam guide added according to the invention. The added beam guide can generate a deflection which has a component that is transverse to the movement generated by the conventional beam guide 2. The additional guide can use a reciprocating movement or also a superimposed movement in both dimensions of the workpiece surface. Its amplitude can be smaller than that of the maximum deflection of the conventional beam guide. As far as a reciprocating movement or a movement periodic in some respects is generated by the added beam guide, its frequency can be a fraction of the frequency of the laser working pulses, e.g. more than 5% or more than 10% or 1/n (n=integer) of the laser pulse frequency. Several working pulses of the laser beam are produced per period of the additional movement.

FIG. 3 shows how to generate the desired movement in various embodiments. The movement patterns of FIG. 3 are presentations of laser beam guides in the workpiece surface plane, i.e. in the x/y planes.

Figure 3A:
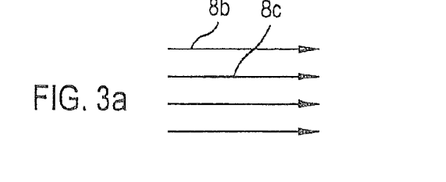
FIG. 3 shows embodiments according to the invention.
Figure 3B:
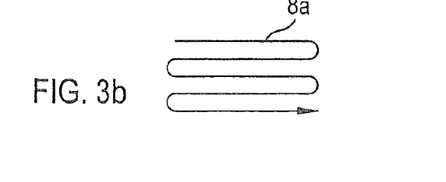
Figure 3C:
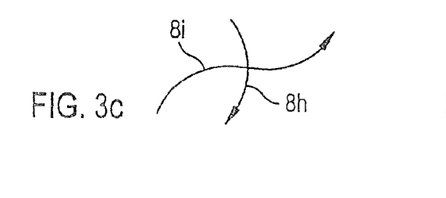

FIGS. 3a, 3b and 3c show beam guides as can be generated by the conventional beam guide. In this context, FIG. 3a corresponds, at least area by area, to the beam guide of FIG. 1d, and FIG. 3b corresponds to the beam guide of FIG. 1b. FIG. 3c shows two defined paths 8h and 8i which are successively adjusted by the conventional beam guide and which may also intersect.

Figure 3D:
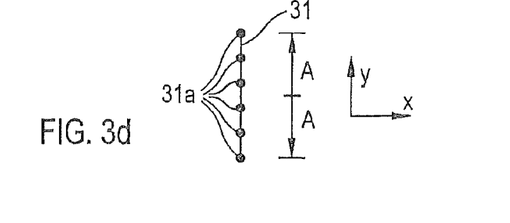
Figure 3E:
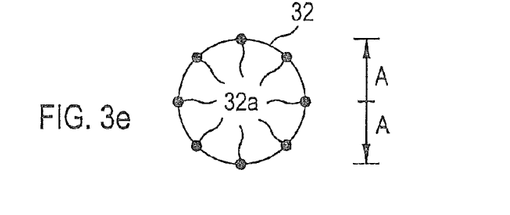
Figure 3F:
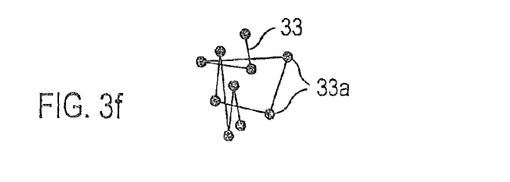

FIGS. 3d, 3e and 3f show movement patterns which can be adjusted by another beam guide and which can be superimposed on the movement generated by the conventional beam guide. Pattern 31 shows a vertical up-and-down movement during which several laser pulses may occur in a cycle. For example, if during a period of the movement of FIG. 3d ten (general: n) working pulses are to occur, the periodicity of the movement will be one tenth (in general: 1/n) of the laser pulse frequency. The deflection 2a (double amplitude A) can be selected in accordance with the beam diameter dS. It may be a multiple of the laser beam diameter, e.g. more than 2-fold, more than 10-fold or more than 50-fold. On the other hand, the deflection 2a can be less than ten times or also less than five times the laser beam diameter dS at the workpiece level. In general, the technically possible deflection range of the second guide can be utilized. With +/−1° and a path length of 200 mm, for example, a deflection of almost 7 mm results. In order to avoid boundary effects, extremes in the use can be avoided.

FIG. 3e shows another pattern where a circular motion is introduced which is superimposed on the conventional movement. Several machining pulses occur during a cycle. Considerations on the periodicity are the same as those with respect to FIG. 3d.

The movement of FIG. 3d can be changed so as to change the oscillation direction. For example, it may be such that there remains at least always one certain minimum angle (e.g. 20° or 40°) with respect to the direction of movement which is introduced by the conventional beam guide. For example, it is possible to switch between a vertical oscillation (FIG. 3d) and a horizontal oscillation turned by 90° with respect thereto. FIG. 3f shows an embodiment where the superimposed beam guide is random or quasi-random. It can have movement components in the guide direction of the conventional beam guide and perpendicularly thereto. For example, in a rectangular or square grid pattern, the individual positions can be driven quasi-randomly, yet in a predetermined way, until all positions of the grid pattern have been reached once. Then, the pattern is repeated.

Figure 4:
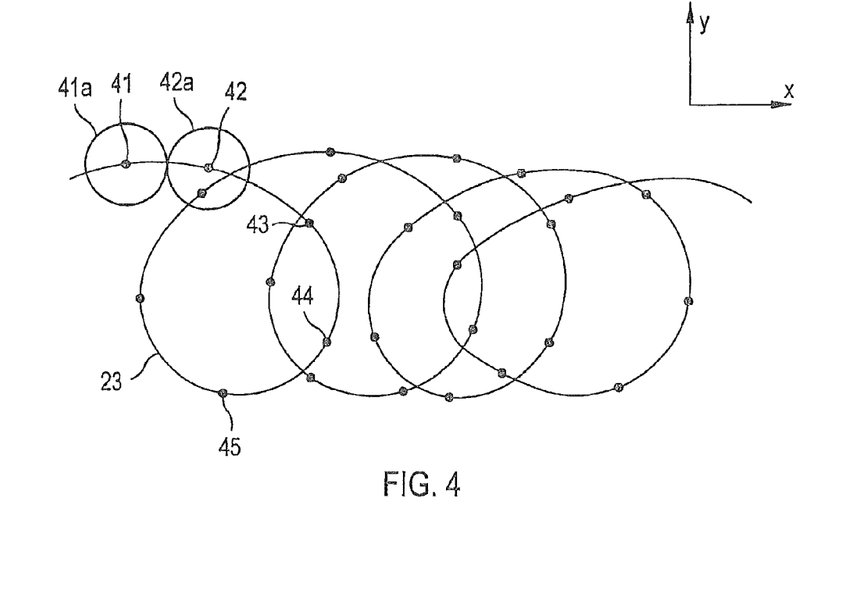
FIG. 4 shows another embodiment according to the invention.

FIG. 4 shows the result of the superimposition of e.g. the conventional guide in accordance with a line of FIG. 3a (e.g. line 8b), for example, and the circular additional guide of FIG. 3e. A skewed spiral results. 23 marks the path along which the laser beam is guided on account of the superimposed movements. The fat dots 41, 42, 43, 44, 45, ... mark the centers of the impingement positions of the individual working pulses of the laser light. In addition to the centers 41 and 42, the respective laser beam diameters 41a, 42a are also drawn. The drawing is such that the individual impingement points of successive pulses just abut. However, the dimensions can also be such that they overlap more strongly or are farther apart from one another than shown in the drawing. With a constant working laser pulse frequency fL and given conventional guide this can be achieved, on the one hand, by a rotational frequency control with respect to the laser pulse frequency fL and, on the other hand, by the amplitude control of the superimposed movement.

As regards its own path speed, the superimposed movement is usually markedly higher than that of the movement driven by the conventional guide. However, the amplitude (maximum possible deflection) is also usually smaller. The superimposed movement can be such that a certain point on the workpiece is hit twice or several times by a laser beam when it travels over the area. On the other hand, the parameters can also be adjusted so as to also achieve a reliable area-wide and only single traverse over all points of the workpiece surface to be machined with the superimposed movement when the surface is skimmed. For example, this can be effected by suitably selecting the deflection amplitude, step width and frequency of the superimposed movement.

In general, the result of the superimposed guide can be that from a macroscopic point of view the guide is similar to the conventional guide in so far as the large movement over the workpiece is predetermined by the conventional guide as usual. However, the traveled paths can be wider due to the additional lateral deflection so as to have wider tracks from many more or less adjoining operating points as compared to the prior art technology. Correspondingly, the conventional guide can introduce tracks which are spaced farther apart.

Figure 5:
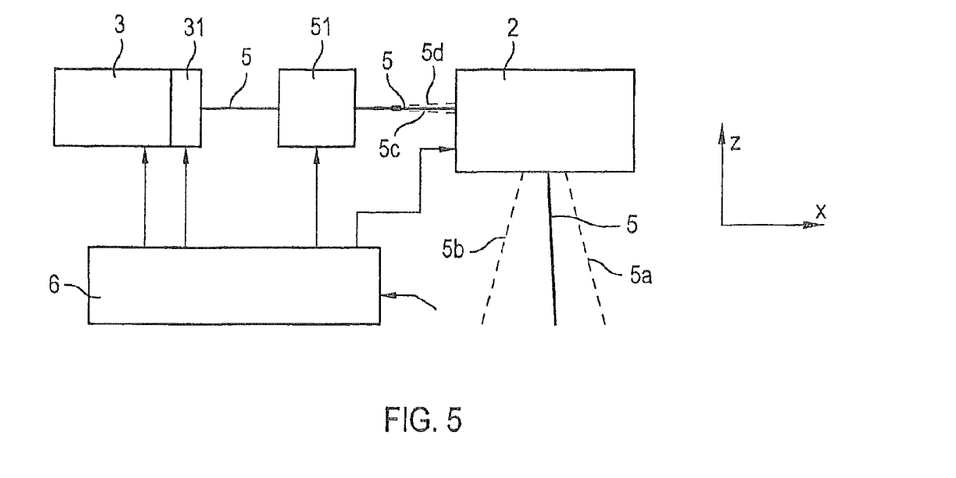
FIG. 5 shows a device according to the invention.

FIG. 5 schematically shows a machining device according to the invention. The same reference numerals as those in FIG. 1a show equal components. 5a and 5b designate in dashed lines the maximum possible deflections of the laser beam 5 which can be caused by the beam guide 2. Correspondingly, they define a working window on the workpiece surface.

A further beam guide 51 is provided which may be within the beam path upstream of the conventional beam guide 2. It also generates an angular deflection of the laser beam, whose maximum limitation is shown by dashed lines 5c and 5d. According to the smaller amplitude of the additional beam guide device 51, the maximum possible angle of movement can be smaller than that of the conventional beam guide 2. However, the additional beam guide 51 can also be provided uniformly with the conventional beam guide 2, e.g. by adjusting mirrors of the conventional beam guide apparatus in themselves once again or the like. The additional second guide device 51 can also be driven by the control 6. Depending on the requirement, it can be activated and deactivated separately so that it can be added to the conventional guide, where appropriate.

The drive signals to the second guide device 51 are generated so as to form the respectively desired guide patterns, in particular one of those of FIG. 3d, 3e or 3f. The second guide can effect a deflection of the laser beam in both dimensions of the surface of the workpiece (x, y). However, in another embodiment only a one-dimensional deflection can be adjustable.

The second guide 51 can have one or several acousto-optical elements or electro-optical elements which determine the deflection according to the frequency of an applied acoustic or electrical signal, for example. It can also have one or several piezoelectric elements. It may also be a mechanically oscillating element, e.g. a rotary transparent or reflecting disk located in the beam path and having different direction properties. In order to effect a deflection along two dimensions (corresponding to x and y on the workpiece surface), it is possible to provide, where appropriate, elements intersecting in their effective direction.

When the second guide operates periodically, its working period can be adjusted to the laser pulse frequency fL, e.g. such that the working frequency of the second guide is a preferably integer fraction of the laser pulse frequency fL. On the other hand, an accurate adjustment of the frequencies and/or period durations can also be provided such that the following applies to the period duration 'T2 of the second guide:

$$1/f2=T2=n*tL+tR$$

wherein n is the number of working pulses per period of the second guide and tR is a duration required for the return of the second guide and other time-outs.

The guide direction of the second guide can be permanent in one direction (reciprocating). However, this one direction can be variable in time. Yet, the working laser beam can also be deflected systematically such that it is deflected on the workpiece surface in the two dimensions thereof (x, y). The deflection can be adjusted such that it always has a certain angular relationship with respect to the momentary direction of movement which is generated by the first guide by being aligned with respect thereto or by being rectangular thereto or observing a certain angular range.

The invention is suitable for both the machining of a surface and the formation of a cavity. When the surface is machined, a single skimming of all surface areas to be machined can be sufficient. When the cavity is formed, certain areas are usually skimmed in the x-y plane several times, material having a certain thickness being removed each time. Due to the plurality of removed layers one then protrudes deeper and deeper into the cavity.

In this connection, the layer thicknesses or penetration depths per pulse may be 10 preferably below 2 or 1 μm, more preferably below 0.25 μM.

The lower limit of the path speed caused by the first guide alone can be 20 or 50 or 100 mm/s. Its upper limit can be 100 mm/s or 200 mm/s or 500 mm/s.

Considered laser beam diameters at the level of the workpiece surface can have 50 μm or 20 μm as the upper limit and 2 μm or 5 μm or 10 μm as the lower limit.

The amplitude of the deflection caused by the second guide can be limited upwards to 2 mm or to 1 mm or to 50 μm. It can also be limited upwards to 200 times or 100 times or 50 times the diameter of the laser beam on the workpiece surface. The amplitude can be limited downwards to 5 μm or 10 μm or also to two times the diameter of the laser beam on the workpiece surface.

The frequency f2 of the second guide (reciprocal value of the period duration t2) can be greater than n times the laser period tL, n being 3 or 5 or 7.

When the beam guide is introduced by the second guide, the working positions can also be tracked to the effect that the actual working positions of the laser beam (caused by the effects of the first and the second guides) are tracked and recorded and that according to these records further drives of the second guide are made, in particular to "hit" areas that have not been hit so far. Correspondingly, a detection device for the already machined positions on the workpiece surface can be provided as well as a memory to store the result of the detection and provide it for the subsequent evaluation. The diameter of the laser beam on the workpiece surface can be determined by focusing on an intensity limit value for determining the diameter as compared to the central intensity when the cross-section is not clearly defined, e.g. to 50% or to a value $1/e$ or $1/e^2$ of the central intensity. ISO 11146 can be considered.

The invention claimed is:

1. A method for machining a workpiece wherein a laser beam pulsating with a pulse frequency fL is guided over the workpiece surface by means of a beam guide,
   characterized in that
   the laser beam is guided such that its path speed vB on the workpiece surface complies with the following condition:

$$vB>n*dS*fL$$

wherein n is a proportional factor which is 0.4 or greater, dS is the beam diameter at the workpiece level, and wherein the pulse frequency is greater than 100 kHz.

2. The method for machining a workpiece, in particular according to claim 1, wherein a laser beam is guided by means of a beam guide over the workpiece surface, the laser beam guide comprising a first guide which on its own effects a laser beam guide with a first path speed,
   characterized in that
   the laser beam guide comprises a second guide simultaneously operating with the first guide, which on its own effects a laser beam guide with a second path speed which is higher than the first path speed.

3. The method according to claim 2, characterized in that the amplitude of the first guide is higher than that of the second guide.

4. The method according to claim 2, characterized in that the first guide and/or the second guide effect a laser beam movement along two dimensions on the workpiece surface.

5. The method according to claim 2, characterized in that when viewed in laser light propagation direction initially the second guide and then the first guide influence the laser beam.

6. The method according to claim 2, characterized in that the second guide is electro-optical, acousto-optical or piezoelectric.

7. The method according to claim 2, characterized in that the second guide guides the laser beam in randomly determined fashion.

8. The method according to claim 1, characterized in that the second guide guides the laser beam in a direction which differs from the guide direction of the first guide.

9. The method according to claim 2, characterized in that the first and second guides are superimposed.

10. The method according to claim 1, which is designed for machining a surface or for forming a cavity.

11. The method according to claim 1, characterized in that each pulse of the pulsating laser beam is suitable for removing material.

12. A device for machining a workpiece, in particular for carrying out the method according to claim 1, comprising
    a laser light source for generating a pulsating laser beam, and
    a beam guide for guiding the laser beam over the workpiece surface,
    characterized in that
    the laser light source generates the laser beam with a pulse frequency of at least 100 kHz, and
    the beam guide guides the laser beam such that its path speed vB on the workpiece surface complies with the following condition:

$$vB > n*dS*fL$$

wherein n is a proportional factor which is 0.4 or greater, dS is the beam diameter at the workpiece level, and fL is the pulse frequency of the working pulses of the laser beam.

13. The device, in particular according to claim 12, for machining a workpiece, comprising
a laser light source for generating a pulsating laser beam, and
a beam guide for guiding the laser beam over the workpiece surface, which has a first guide means which effects a laser beam guide with a first path speed,
characterized in that
the beam guide has a second guide means simultaneously operable with the first guide device, which effects a laser beam guide with a second path speed which is higher than the first path speed.

14. The device according to claim 13, characterized in that the second guide means comprises one or more of the following elements:
an electro-optical element,
an acousto-optical element,
a translationally or rotatorily adjustable optical element.

15. The device according to claim 13, characterized in that the first guide means is in the beam path downstream of the second guide means.

16. The method of claim 1, further including guiding said laser beam by generating a second guide movement superimposed on a first guide movement in such a manner that said path speed vB on the workpiece surface is caused to comply with said condition.

17. The method of claim 1, wherein said laser beam is guided such that the overlap amongst adjacent pulses is less than 50%.

18. The method of claim 1, wherein said laser beam is guided such that the overlap amongst adjacent pulses is less than 30%.

19. The device according to claim 12, wherein said beam guide guides said laser beam such that the overlap amongst adjacent pulses is less than 50%.

20. The device according to claim 12, wherein said beam guide guides said laser beam such that the overlap amongst adjacent pulses is less than 30%.

* * * * *

UNITED STATES PATENT AND TRADEMARK OFFICE
CERTIFICATE OF CORRECTION

PATENT NO.         : 8,847,109 B2  
APPLICATION NO.    : 12/531591  
DATED              : September 30, 2014  
INVENTOR(S)        : Michael Kuhl et al.

Page 1 of 1

It is certified that error appears in the above-identified patent and that said Letters Patent is hereby corrected as shown below:

On the title page item (22)  
Change

"Mar. 17, 2009"

To Be

--Mar. 17, 2008--

On the title page item (86)  
Change

"PCT/EP2009/002104"

To Be

--PCT/EP2008/002104--

Signed and Sealed this  
Third Day of March, 2015

Michelle K. Lee  
*Deputy Director of the United States Patent and Trademark Office*